United States Patent Office 3,479,367
Patented Nov. 18, 1969

3,479,367
1-SUBSTITUTED-2-ALKYL-5-NITROIMIDAZOLES
Max W. Miller, North Stonington, Conn., assignor to Chas. Pfizer & Co., Inc., New York, N.Y., a corporation of Delaware
No Drawing. Filed Oct. 3, 1966, Ser. No. 583,945
Int. Cl. C07d 49/36; A61k 27/00
U.S. Cl. 260—309                                    4 Claims

ABSTRACT OF THE DISCLOSURE

Novel 1-substituted-2-alkyl-5-nitroimidazoles, useful in combatting trichomonal infections.

---

This application relates to novel and useful imidazole derivatives and, more particularly, to certain 5-nitroimidazole compounds which are effective in the treatment and prevention of trichomonal infections.

Examples of trichomonal infections include trichomonal vaginitis, a troublesome vaginal infection caused by paraseitic protozoan *Trichomonas vaginalis* and bovine trichomoniasis caused by *Trichomonas foetus*. Up to now, various medicaments and methods of treatment have been used with varying degrees of effectiveness. In the treatment of vaginitis, a number of different drug classes are involved, for example, sulfonamides, fungicides, penicillin, vaginal cleansers, etc. In addition, a variety of product forms are currently utilized: ointments, jellies, creams, powders, douches, vaginal tablets, vaginal suppositories, oral tablets, liquids, and several other forms.

The novel 5-nitroimidazole compounds of this invention are represented by the following structural formulae:

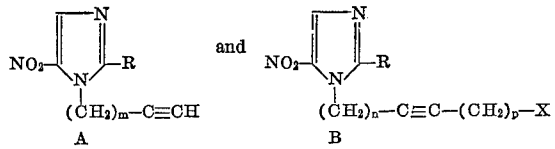

and the pharmaceutically-acceptable acid addition salts thereof, wherein R is alkyl of from 1 to 6 carbon atoms; m is an integer straight or branch chained from 1 to 4; n is an integer from 1 to 3 and p is an integer from 1 to 3 provided that the sum of n and p is never greater than 4; and X is a member selected from the group consisting of hydroxy, halogen (F, Cl, Br, I), nitro, amino and mono- and di-substituted alkylamino, said alkyl containing up to 6 carbon atoms.

The novel 5-nitroimidazoles disclosed herein are prepared by the synthetic scheme outlined hereinbelow:

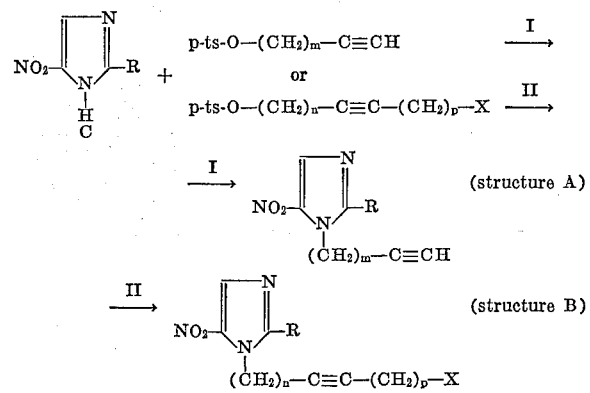

wherein R, m, n, p and X are as defined earlier. The symbol p-ts- signifies the p-toluenesulfonyl radical having the chemical structure

Steps I and II are generally carried out without a solvent, although it is possible to utilize a solvent provided its boiling point is sufficiently high to allow refluxing temperatures adequate for complete reaction. This temperature range is from about 120–150° C. In most instances, however, no solvent will be used and the mixture of p-toluene sulfonate and 5-nitroimidazole is simply heated to a temperature of from 130 to about 150° C. with stirring and held there for a period of from three to about five hours. The resulting mixture is then extracted with warm water subsequently made basic (pH 9) with a 10% sodium carbonate solution. The reaction product as free base is then extracted with an organic solvent, for example, chloroform, separated, dried and isolated by evaporation of solvent. The oil residue crystallizes on standing and re-crystallized if desired.

The 5-nitroimidazole starting materials (Formula C) are either commercially available or described in the literature and can be easily made by well-known organic synthetic procedures. As for the p-toluene solfonate starting materials, a suitable working procedure has been worked out and can be shown chemically by the following sequence:

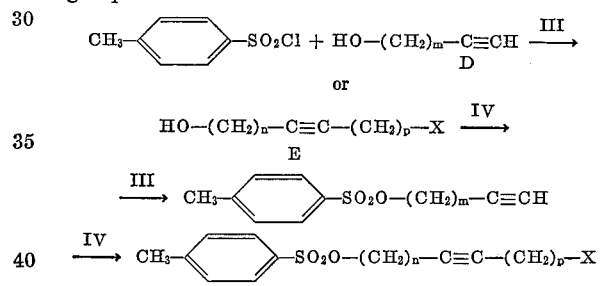

To p-toluenesulfonyl chloride dissolved in ethylene dichloride is added the appropriate alcohol (D or E) followed by the addition of a slight molar excess of a 40% aqueous solution of sodium hydroxide. During the addition of base, the reaction temperature is maintained at 15–25° C. by means of an ice-bath. On completion of addition, the reaction mixture is stirred at room temperature for another 10–20 hours and then diluted with water. The ethylene dichloride layer is separated, washed with 2 N HCl and then water, and then dried over sodium sulfate. The dried solution is then concentrated leaving an oil residue product. Generally, this resulting intermediate can be used directly in the next step in the condition it is isolated; however, if desired, it can be crystallized from a suitable solvent or allowed to crystallize on standing.

At the present time, 1-(2-hydroxyethyl)-2-methyl-5-nitroimidazole is the most effective anti-trichomonal agent known. It has been discovered, unexpectedly, that certain compounds of the present invention are more active than 1-(2-hydroxyethyl)-2-methyl - 5 - nitroimidazole while others have similar activity. For instance, 1-(3-butynyl)-2-methyl-5-nitroimidazole is four times as effective as 1-(2-hydroxyethyl)-2-methyl-5-nitroimidazole while 1-(2-propynyl)-2-methyl-5-nitroimidazole has equivalent activity. Such results are especially unexpected in light of a recent literature publication, Arzneimittelforschung 16 No. 1, p. 27 (1966) which reports loss of activity in 1 - substituted-2-methyl-5-nitroimidazoles in progressing from saturated to unsaturated chains. Specifically, they tabulate the difference in activity between 1-ethyl and 1-vinyl and 1-propyl and 1-allyl. In each instance, the 1- alkyl derivative has twice the activity as the corresponding ethylenically-unsaturated derivative. It would therefore be anticipated that the corresponding acetylenically-unsaturated derivatives should have activity similar to the ethylenic compounds. This was not the case. In fact, just the opopsite was true. The novel acetylenic compounds of this invention not only have activity greater than the analogous 1-alkyl derivatives but have activity comparable to 1-(2-hydroxyethyl)-2-methyl-5-nitroimidazole.

The 5-nitroimidazole compounds disclosed herein are preferably administered as such or in the form of acid addition salts containing pharmaceutically-acceptable anions. Examples of acids which provide pharmaceutically acceptable anions are hydrochloric, hydrobromic, hydroiodic, nitric, sulfuric, or sulfurous, phosphoric, acetic, lactic, citric, tartaric, oxalic, succinic, maleic and gluconic. The conversion of the herein disclosed 5-nitroimidazole compounds to their acid addition salts comprises treating said compounds with a substantially equimolar amount of a chosen acid in a suitable organic solvent such as methanol or ethanol. Since the acid addition salts of the novel compounds disclosed herein are somewhat unstable under aqueous conditions, especially in aqueous acid solutions, it is preferred to prepare such salts under anhydrous conditions. When such salts are to be used for human consumption, either orally or parenterally, the acids which are used to prepare the pharmaceutically-acceptable addition salts must, of course, be those which necessarily form non-toxic acid addition salts.

The method of treatment employed for the control of trichomonal infections which is particularly preferred is oral administration, however, topical and parenteral application are also found to be suitable. Moreover, said oral medicament can be supplied in the form of a tablet formulation characterized by high trichomonadicidal power and capable of giving symptomatic relief to the host.

The activity of the novel herein disclosed compounds is determined by an in vivo test in the following manner: Animals to be tested are inoculated with a trichomonal test organism (intra-peritoneally). Dose levels of anti-trichomonal agent ranging from 10 to 200 mg./kg. are administered orally over a period of three days once a day. On the completion of said time period, a comparison is made based on the number cleared of infection/number of infected animals, between those treated with the herein disclosed anti-trichomonal agents and a control, 1-(2-hydroxyethyl)-2-methyl-5-nitroimidazole.

The following examples are provided by way of illustration and should not be interpreted as limiting the invention, many variations of which are possible without departing from the spirit or scope thereof.

EXAMPLE I 1-(2-propynyl)-2-methyl-5-nitroimidazole (A) A mixture containing 2-methyl-5-nitroimidazole (12.7 g.) and propargyl-p-toluenesulfonate (42.0 g.) is stirred and heated to 140° C. for about 3–4 hours. After this heating period, the reaction mixture is allowed to cool and then extracted with hot water (3× with 200 ml.). The aqueous phase is then adjusted to a pH of 9 with 10% sodium carbonate solution and then extracted 3 times with 150 ml. portions of chloroform. The chloroform extract is separated, washed, dried and evaporated almost to dryness. On standing, the oil residue crystallizes to a low-melting solid weighing 4.4 g.

(B) The necessary reagent, propargyl-p-toluenesulfonate, used above is prepared in the following manner:

To a solution of p-toluenesulfonyl chloride (95.0 g.) in ethylene dichloride (125 ml.) is added propargyl alcohol (30.4 g.), followed by the addition of 22 g. of a 40% aqueous sodium hydroxide solution. This latter addition is over ½ hour period and the temperature of the reaction mixture is held at 14–25° C. during this time by means of an ice-bath. On completion, the mixture is stirred for another 20 hours at room temperature. To the reaction mixture is then added 100 ml. of water and 50 ml. of ethylene dichloride. The organic phase is separated, washed with 2 N HCl, then water, dried and evaporated to dryness. The resulting oil, $n_D^{26}$ 1.543, is the desired product.

EXAMPLE II 1-(3-butynyl)-2-methyl-5-nitroimidazole

The procedure of Example I (part A) is repeated wherein a stoichiometric equivalent amount of 3-butynyl-p-toluenesulfonate is used in place of proparagyl-p-toluenesulfonate with comparable results. The product is a crystalline solid having a M.P. 73–75° C.

Similarly, 3-butynyl-p-toluenesulfonate is prepared by means of the procedure outlined in part B of Example I wherein a stoichiometric equivalent amount of 3-butyn-1-ol is used in lieu of propargyl alcohol with good results.

EXAMPLE III 1-(4-hydroxy-2-butynyl)-2-methyl-5-nitroimidazole

The procedure of Example I (part A) is repeated wherein a stoichiometric equivalent amount of 4-hydroxy-2-butynyl-p-toluenesulfonate is used in place of propargyl-p-toluenesulfonate with comparable results. The product is a crystalline solid having a M.P. 175° C.

Similarly, 4 - hydroxy - 2 - butynyl-p-toluenesulfonate is prepared by means of the procedure outlined in part B of Example I wherein a stoichiometric equivalent amount of 2-butyn-1,4-diol is used in lieu of propargyl alcohol with good results.

EXAMPLE IV

The procedure of Example I is repeated wherein stoichiometric equivalent amounts of the following 5-nitroimidazole derivatives and p-toluenesulfonates are reacted in place of 2-methyl-5-nitroimidazole and propargyl-p-toluenesulfonates are reacted in place of 2-methyl-5-nitroimidazole and propargyl-p-toluenesulfonate respectively with the indicated products being obtained in substantial yields:

| 5-nitroimidazole derivative | p-Toluenesulfonate | Product |
| --- | --- | --- |
| 2-methyl-5-nitroimidazole. | 4-pentynyl-p-toluenesulfonate. | 1-(4-pentynyl)2-methyl-5-nitroimidazole. |
| 2-ethyl-5-nitroimidazole. | 5-hexynyl-p-toluenesulfonate. | 1-(5-hexynyl)2-ethyl-5-nitroimidazole. |
| 2-methyl-5-nitroimidazole. | 1-n-propyl propargyl-p-toluenesulfonate. | 1-[2(1-n-propyl) propynyl[-2-methyl-5-nitroimidazole. |
| 2-butyl-5-nitroimidazole. | 1-isopropyl propargyl-p-toluenesulfonate. | 1-[2(1-isopropyl) propynyl[-2-butyl-5-nitroimidazole. |
| 2-n-propyl-5-nitroimidazole. | 5-chloro-2-pentynyl-p-toluenesulfonate. | 1-(5-chloro-2-pentynyl)-2-n-propyl-5-nitroimidazole. |
| 2-isopropyl-5-nitroimidazole. | 6-bromo-3-hexynyl-p-toluenesulfonate. | 1-(6-bromo-3-hexynyl)-2-isopropyl-5-nitroimidazole. |
| 2-butyl-5-nitroimidazole. | 6-nito-4-hexynl-p-toluenesulfonate. | 1-(6-nitro-4-hexynyl)-2-butyl-5-nitroimidazole. |
| 2-pentyl-5-nitroimidazole. | 6-amino-2-hexynyl-p-toluenesulfonate. | 1-(6-amino-2-hexynyl)-2-pentyl-5-nitroimidazole. |
| 2-hexyl-5-nitroimidazole. | 4-dimethylamino-2-butynyl-p-toluenesulfonate. | 1-(4-dimethylamino-2-butynyl)-2-hexyl-5-nitroimidazole. |
| 2-methyl-5-nitroimidazole. | 4-hexylamino-2-butynyl-p-toluenesulfonate. | 1-(4-hexylamino-2-butynyl)-2-methyl-5-nitroimidazole. |
| 2-ethyl-5-nitroimidazole. | 4-fluoro-2-butynyl-p-toluenesulfonate. | 1-(4-fluoro-2-butynyl)-2-ethyl-5-nitroimidazole. |
| 2-ethyl-5-nitroimidazole. | 4-iodo-2-butynyl-p-toluenesulfonate. | 1-(4-iodo-2-butynyl)-2-ethyl-5-nitroimidazole. |

The p-toluenesulfonate derivatives listed above are prepared by the procedure of part B in Example I wherein the appropriate alcohol is used in lieu of propargyl alcohol and good yields of product are obtained in each instance.

EXAMPLE V

The 5-nitroimidazole compounds disclosed herein may be converted to their acid addition salts by the following general procedure:

To a methanolic solution containing the 5-nitroimidazole free base (1 M) is added a stoichiometric equivalent amount of a suitable acid. The resulting solution is subsequently stripped free of solvent and the precipitate (acid addition salt) is filtered and dried. Other suitable solvents, for example, ethanol, may be used. The following acid addition salts are typical examples prepared using the above said procedure and substantial yields of product are obtained:

| Free Base | Acid | Acid Addition Salt |
|---|---|---|
| 1-(3-butynyl)-2-methyl-5-nitroimidazole. | HCl | 1-(3-butynyl)-2-methyl-5-nitroimidazole hydrochloride. |
| 1-(2-propynyl)-2-methyl-5-nitroimidazole. | HBr | 1-(2-propynyl)-2-methyl-5-nitroimidazole hydrobromide. |
| 1-(4-hydroxy-2-butynyl)-2-methyl-5-nitroimidazole. | HI | 1-(4-hydroxy-2-butynyl)-2-methyl-5-nitroimidazole hydroiodide. |
| 1-(4-hexylamino-2-butynyl)-2-methyl-5-nitroimidazole. | Citric acid. | 1-(4-hexylamino-2-butynyl)-2-methyl-5-nitroimidazole citrate. |

EXAMPLE VI

The following evaluation was undertaken to determine the effectiveness of 1-(3-butynyl)-2-methyl-5-nitroimidazole against *T. foetus* in the following manner:

Mice are inoculated with *T. foetus* organism intraperitoneally. The experimental anti-trichomonal agent is then administered orally in doses ranging from 10–200 mg./kg. daily over a 3 day period. The effectiveness of said agent is based on the minimum effective dose (M.E.D.) level to clear infection of *T. foetus* in mice in comparison to a control, that is, mice treated with 1-(2-hydroxyethyl)-2-methyl-5-nitroimidazole and the following results are obtained:

| Anti-trichomonal agent | Drug level, mg./kg., M.E.D. | Treatment (days) | No. cleared/No. infected |
|---|---|---|---|
| 1-(3-butynyl)-2-methyl-5-nitroimidazole. | 25 | 3 | 10/10 |
| 1-(2-hydroxyethyl)-2-methyl-5-nitroimidazole (control). | 100 | 3 | 10/10 |

Similarly, 1-(2-propynyl)-2-methyl-5-nitroimidazole and 1-(4-hydroxy-2-butylyl)-2-methyl-5-nitroimidazole were evaluated in the above described test with the ensuing results:

| Agent | M.E.D. | Treatment (days) | No. cleared/No. infected |
|---|---|---|---|
| 1-(2-propynyl)-2-methyl-5-nitroimidazole. | 100 | 3 | 10/10 |
| 1-(4-hydroxy-2-butynyl)-2-methyl-5-nitroimidazole. | 200 | 3 | 10/10 |
| 1-(2-hydroxyethyl)-2-methyl-5-nitroimidazole. | 100 | 3 | 10/10 |

EXAMPLE VII

The experimental evaluation as described in Example VI is repeated to determine the effectiveness of those compounds enumerated in Example IV. Good results are obtained in each instance.

What is claimed is:

1. A compound selected from the group consisting of those of the formulae:

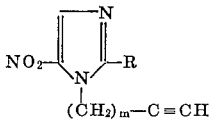

and

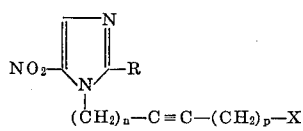

and the pharmaceutically-acceptable acid addition salts thereof, wherein R is alkyl of from 1 to 6 carbon atoms; $m$ is an integer from 1 to 4; $n$ is an integer from 1 to 3 and $p$ is an integer from 1 to 3 provided that the sum of $n$ and $p$ is never greater than 4; and X is a member selected from the group consisting of hydroxy, fluoro, chloro, bromo, iodo, nitro, amino, and mono- and disubstituted alkylamino, said alkyl being of up to 6 carbon atoms.

2. A compound as claimed in claim 1 wherein R is methyl and $m$ is 2.

3. A compound as claimed in claim 1 wherein R is methyl and $m$ is 1.

4. A compound as claimed in claim 1 wherein R is methyl, $n$ is 1, $p$ is 1 and X is hydroxy.

References Cited

UNITED STATES PATENTS

| 3,236,856 | 2/1966 | Parnell | 260—309 |
| 3,391,156 | 7/1968 | Beaman et al. | 260—309 |

HENRY R. JILES, Primary Examiner

NATALIE TROUSOF, Assistant Examiner

U.S. Cl. X.R.

260—456, 584, 632, 633, 635; 424—273